United States Patent
Kim

(10) Patent No.: US 12,117,554 B2
(45) Date of Patent: Oct. 15, 2024

(54) RADAR MODULE USING MULTIPLE POLARIZATIONS

(71) Applicant: ATCODI CO., LTD, Seoul (KR)

(72) Inventor: Jeong pyo Kim, Suwon-si (KR)

(73) Assignee: ATCODI CO., LTD, Seoul (KR)

( * ) Notice: Subject to any disclaimer, the term of this patent is extended or adjusted under 35 U.S.C. 154(b) by 0 days.

(21) Appl. No.: 18/292,324

(22) PCT Filed: Jul. 29, 2021

(86) PCT No.: PCT/KR2021/009854
§ 371 (c)(1),
(2) Date: Jan. 25, 2024

(87) PCT Pub. No.: WO2023/008612
PCT Pub. Date: Feb. 2, 2023

(65) Prior Publication Data
US 2024/0264268 A1 Aug. 8, 2024

(30) Foreign Application Priority Data
Jul. 28, 2021 (KR) .......... 10-2021-0099214

(51) Int. Cl.
*G01S 7/02* (2006.01)
*G01S 7/03* (2006.01)
*G01S 13/931* (2020.01)

(52) U.S. Cl.
CPC ............ *G01S 7/026* (2013.01); *G01S 7/0231* (2021.05); *G01S 7/03* (2013.01); *G01S 13/931* (2013.01)

(58) Field of Classification Search
CPC .......... G01S 7/026; G01S 7/0231; G01S 7/03; G01S 13/931
See application file for complete search history.

(56) References Cited

U.S. PATENT DOCUMENTS 5,659,322 A * 8/1997 Caille .................. H01Q 21/245
342/188
6,545,647 B1 * 4/2003 Sievenpiper ........... H01Q 21/26
343/756
(Continued)

FOREIGN PATENT DOCUMENTS

JP H08194055 A 7/1996
JP 2011257376 A 12/2011
(Continued)

OTHER PUBLICATIONS

International search report of PCT/KR2021/009854, Apr. 20, 2022, English translation.
(Continued)

*Primary Examiner* — Peter M Bythrow
(74) *Attorney, Agent, or Firm* — STIP Law Group, LLC

(57) ABSTRACT

A radar module using multiple polarizations according to an embodiment of the present invention comprises a transmission channel unit (Tx) including a 1-1st antenna and a 1-2nd antenna electromagnetic waves representing different for transmitting polarization characteristics; a reception channel unit (Rx) including N (where N is a natural number) reception channels including a 2-1st antenna and a 2-2nd antenna for receiving echo waves of the electromagnetic waves transmitted by the transmission channel unit to an object and reflected back from the object; and a control unit for selecting the driving mode of the transmission channel unit and the reception channel unit, wherein the 1-1st and 1-2nd antennas are configured so that the electromagnetic wave transmitted by the 1-1st antenna and the electromagnetic wave transmitted by the 1-2nd antenna represent orthogonal polarization characteristics.

6 Claims, 11 Drawing Sheets

(56) References Cited

U.S. PATENT DOCUMENTS

| | | | | |
|---|---|---|---|---|
| 6,731,241 B2* | 5/2004 | Park | ............... | H01Q 21/24 |
| | | | | 342/361 |
| 7,834,803 B2* | 11/2010 | Weinstein | ............ | H01Q 21/24 |
| | | | | 342/149 |
| 8,098,189 B1* | 1/2012 | Woodell | ............ | G01S 7/025 |
| | | | | 342/26 B |
| 9,391,375 B1* | 7/2016 | Bales | ............ | H01Q 21/064 |
| 2017/0353338 A1* | 12/2017 | Amadjikpe | ........ | H01Q 21/245 |
| 2018/0066991 A1* | 3/2018 | Mueller | ............ | H01Q 21/24 |
| 2019/0187247 A1* | 6/2019 | Izadian | ............ | G01S 7/025 |
| 2020/0271751 A1* | 8/2020 | Mayer | ............ | G01S 7/411 |
| 2021/0239791 A1* | 8/2021 | Vollbracht | ............ | G01S 7/025 |
| 2022/0069477 A1* | 3/2022 | Maruyama | ........ | G01S 13/4463 |

FOREIGN PATENT DOCUMENTS

| | | | |
|---|---|---|---|
| JP | 2020180883 A | | 11/2020 |
| KR | 20200086753 A | | 7/2020 |
| KR | 20200096633 A | | 8/2020 |
| KR | 102218965 B1 | | 2/2021 |

OTHER PUBLICATIONS

Amirreza Safaripour et al, Dynamic Polarization Control of Two-Dimensional Integrated Phased Arrays, IEEE Transactions on Microwave Theory and Techniques, Apr. 2016, vol. 64, No. 4, pp. 1066-1077.

* cited by examiner

RADAR MODULE USING MULTIPLE POLARIZATIONS

CROSS-REFERENCE TO RELATED APPLICATIONS

This application is the U.S. National Phase under 35 U.S.C. § 371 of International Application No. PCT/KR2021/009854, filed on Jul. 29, 2021, which in turn claims the benefit of Korean Application No. 10-2021-0099214, filed on Jul. 28, 2021, the disclosures of which are incorporated by reference into the present application.

TECHNICAL FIELD

The present invention relates to a radar module using multiple polarizations. More specifically, the present invention relates to a radar module using multiple polarizations that is mounted on an autonomous vehicle and that can be used for various purposes.

BACKGROUND ART

An autonomous vehicle means a vehicle that can self-drive without a driver's direct manipulation, and research and development are actively underway to realize level 5 autonomous driving that enables complete autonomous driving.

In such autonomous vehicle, various sensors mounted on the vehicle play a large role in enabling autonomous driving in which an ECU of the vehicle controls various components within the vehicle based on data sensed by the sensors, thereby enabling autonomous driving.

Meanwhile, as a representative example of sensors enabling autonomous driving, there is a radar. This radar is a device that transmits strong electromagnetic waves to a specific object, receives echo waves reflected back from the object and having the same polarization characteristics as those of the transmitted electromagnetic waves and detects the location, moving speed and the like of the object using the echo waves. As radars for autonomous vehicles, there exist a long range radar (LRR) for detecting a long distance, a middle range radar (MRR) for detecting a middle distance, a short range radar (SRR) for detecting a short distance and the like, depending on the driving conditions of the vehicle.

Recently, as the number of vehicles equipped with such radars increases, it is getting closer to the realization of fully autonomous driving. However, on the other hand, for example, as shown in FIG. 1, if radars with the same polarization characteristics are used such as the case that when a radar mounted on a vehicle A traveling in one direction transmits electromagnetic waves front (black arrow) and the transmitted electromagnetic waves hit a vehicle B traveling in the opposite direction, the vehicle A receives echo waves (white arrow) reflected back from the vehicle B and when the radar mounted on the vehicle B transmits the electromagnetic waves front, the vehicle A also receives the electromagnetic waves that hit the vehicle A, there are problems in that very large interference occurs on both sides due to the power difference between the echo waves received by one side and the electromagnetic waves transmitted by nearby vehicles, which can have a negative impact on safe driving by significantly lowering the recognition rate of the radar.

The present invention considers these problems and relates to a radar module of new and advanced technology that can improve the accuracy of radar by overcoming interference between radars and contribute to a driver's safe driving.

The technical problems to be solved by the present invention is to improve the accuracy of radar by overcoming interference between radars and to provide a radar module using multiple polarizations that can contribute to safe driving for a driver.

The technical problems of the present invention are not limited to those mentioned above, and other problems not mentioned will be clearly understood by those skilled in the art from the following description.

A radar module using multiple polarizations according to an embodiment of the present invention for achieving the above technical problems may comprise a transmission channel unit (Tx) including a 1-1st antenna and a 1-2nd antenna for transmitting the electromagnetic waves representing different polarization characteristics; a reception channel unit (Rx) including N (where N is a natural number) reception channels including a 2-1st antenna and a 2-2nd antenna for receiving echo waves of the electromagnetic waves transmitted by the transmission channel unit to an object and reflected back from the object; and a control unit for selecting the driving mode of the transmission channel unit and the reception channel unit, wherein the 1-1st and 1-2nd antennas are configured so that the electromagnetic waves transmitted by the 1-1st antenna and the electromagnetic waves transmitted by the 1-2nd antenna represent orthogonal polarization characteristics.

According to an embodiment, when the control unit selects the driving mode as a first mode, the transmission channel unit may cause the 1-1st antenna to transmit the electromagnetic waves representing 135 deg polarization characteristics, and the receiving channel unit may cause all of the 2-1 antennas included in the N reception channels to receive echo waves representing 135 deg polarization characteristics of the electromagnetic waves transmitted by the 1-1st antenna to the object and reflected back from the object.

According to an embodiment, when the control unit selects the driving mode as the first mode, the transmission channel unit may block a feed signal from being inputted to the 1-2nd antenna.

According to an embodiment, when the control unit selects the driving mode as a second mode, the transmission channel unit may cause the 1-2nd antenna to transmit electromagnetic waves representing 45 deg polarization characteristics, and the receiving channel unit may cause all of the 2-2nd antennas included in the N reception channels to receive echo waves representing 45 deg polarization characteristics of the electromagnetic waves transmitted by the 1-2nd antenna to the object and reflected back from the object.

According to an embodiment, when the control unit selects the driving mode as the second mode, the transmission channel unit may block a feed signal from being inputted to the 1-1st antenna.

According to an embodiment, when the control unit selects the third mode as the constant driving mode, the transmission channel unit may cause the 1-1st antenna to transmit the electromagnetic waves representing 135 deg polarization characteristics and cause the 1-2 antenna to transmit the electromagnetic waves representing deg 45 polarization characteristics, thereby causing the entire transmission channel unit to transmit the electromagnetic waves representing 90 deg polarization characteristics; and the receiving channel unit may cause all of the 2-1 antennas and 2-2 antennas included in the N reception channels to receive echo waves representing 90 deg polarization characteristics of the electromagnetic waves transmitted by the transmission channel unit to the object and reflected back from the object.

According to an embodiment, the 1-1 antenna may transmit electromagnetic waves representing 45 deg polarization characteristics, and the 1-2nd antenna may transmit electromagnetic waves representing the −45 deg polarization characteristics.

According to an embodiment, the transmission channel unit may further include 1-3rd a antenna for transmitting electromagnetic waves representing polarization characteristics different from the polarization characteristics of the electromagnetic waves transmitted by the 1-1st antenna and the polarization characteristics of the electromagnetic waves transmitted by the 1-2nd antenna.

According to an embodiment, the polarization characteristics of the electromagnetic waves transmitted by the 1-3rd antenna may be 90 deg.

According to an embodiment, the control unit may select any one mode of a first mode that causes the 1-1st antenna to transmit electromagnetic waves, a second mode that causes the 1-2nd antenna to transmit electromagnetic waves, and a third mode that causes the 1-3rd antenna to transmit electromagnetic waves.

Effects of the Invention

According to the present invention, the 1-1st antenna 10-1 and the 1-2nd antenna 10-2 included in the transmission channel unit 10 transmit electromagnetic waves representing different polarization characteristics depending on the first to third modes and the first to third modes are alternately performed. Even if an interference occurs in either mode because the polarization characteristics is the same as the electromagnetic wave transmitted by the radar mounted on the opponent vehicle, another mode of transmitting electromagnetic wave representing different polarization characteristics is performed immediately after the corresponding mode has been performed and therefore, the interference between radars can be overcome thereby improving the recognition rate of radar and contributing to safe driving for the driver.

In addition, with regard to the transmission channel unit 10, the transmission channel unit 10 does not need to include a separate antenna for transmitting electromagnetic waves representing 90 deg polarization characteristics and can transmit electromagnetic waves representing 90 deg polarization characteristics by including only the 1-1st antenna 10-1 for transmitting electromagnetic waves representing 135 deg polarization characteristics and the 1-2nd antenna 10-2 for transmitting electromagnetic waves representing 45 deg polarization characteristics, and synthesizing the electromagnetic waves transmitted by these antennas. Therefore, the size of the entire radar module can be miniaturized and manufacturing costs can be reduced at the same time.

The effects of the present invention are not limited to the effects mentioned above, and other effects not mentioned will be clearly understood by those skilled in the art from the description below.

DETAILED DESCRIPTION OF THE INVENTION

Figure 1:
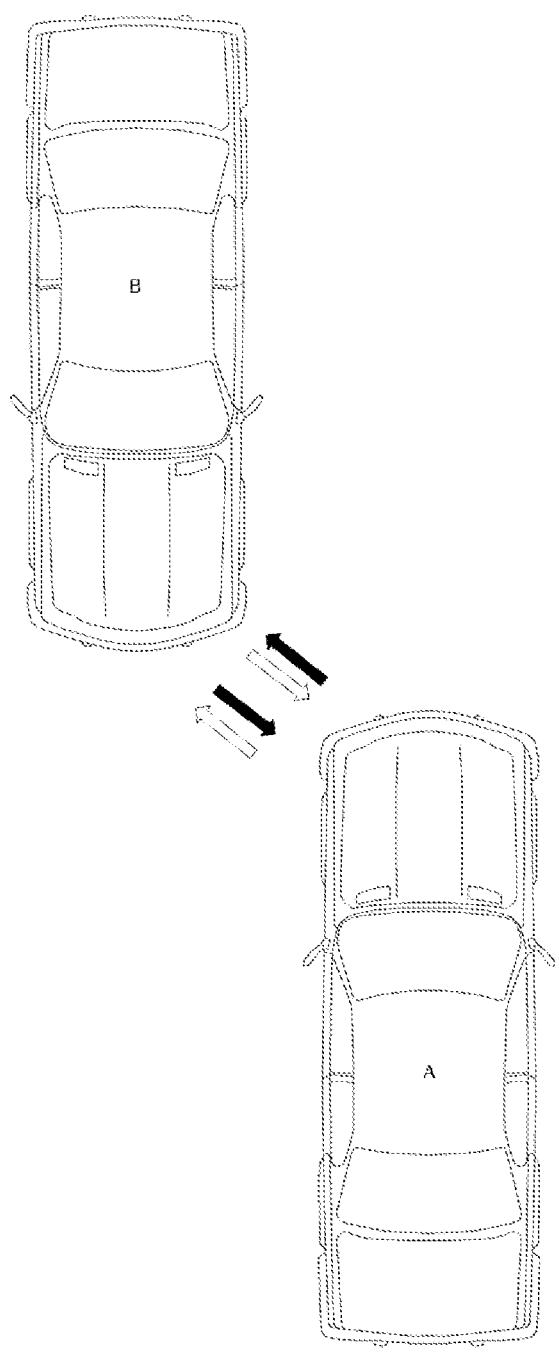
FIG. 1 is a diagram exemplarily illustrating a case in which an interference between radars occurs.

Hereinafter, the preferred embodiments of the present invention will be described in detail with reference to the accompanying drawings. Advantages and features of the present invention and methods of achieving them will be apparent with reference to the embodiments described below in detail together with the accompanying drawings. However, the present invention is not limited to the embodiments disclosed below, and may be implemented in various forms different from each other, and these embodiments are provided only to make the disclosure of the present invention complete and to completely inform the scope of the present invention to those skilled in the art, and the present invention is defined only by the scope of the claims. Throughout the specification, like reference numerals refer to like components.

Unless otherwise defined, all terms (including technical and scientific terms) used in the present specification may be used in a meaning that can be commonly understood by those skilled in the art. In addition, the terms defined in a generally used dictionary are not ideally or excessively interpreted unless explicitly and specially defined. The terms used in the present specification are for describing the embodiments and not intended to limit the present invention. In the present specification, singular forms also include plural forms otherwise specified in the phrase.

The term "Comprises" and/or "comprising" used in the present specification does not exclude presence or addition of one or more other components, steps, operations and/or elements than the mentioned components, steps, operations and/or elements.

FIG. 1 is a top view of a conventional autonomous vehicle (AV) and a region detected by a radar module mounted thereon.

Referring to FIG. 1, it can be seen that the SRR, MRR, and LRR are shown in front of the autonomous vehicle (AV), the SRR and MRR are in the rear, and the WFR detects areas around the vehicle.

Firstly, referring to SRR, MRR, and LRR shown in front of an autonomous vehicle (AV), it can be seen that the longer the detection range (LRR direction), the more concentrated in a specific detection area, and the shorter the detection range (SRR direction), the more the detection area becomes widen. When detecting a long range, collision can be avoided by simply focusing on an object located in a specific area (the same applies to an adaptive cruise control (ACC)). When detecting a short distance, collisions can be avoided by focusing not only on a specific area but also on objects located in the surrounding area.

Next, referring to the SRR and MRR shown on the rear of the autonomous vehicle (AV), basic details are the same as the description regarding the front, but with a difference, it can be seen that the LRR is not shown on the rear. This is because apart from the fact that when an autonomous vehicle is driving front, it can drive at a variety of speeds from slow to fast and thus collision can be avoided by detecting from close to far distances, when an autonomous vehicle is traveling rear, it can travel at a slow speed (some vehicles have limits on reverse speed) and thus unlike fronts, LRR is not required.

This is different from the fact that the autonomous vehicle can drive at various speeds from slow to fast when driving front, so collision avoidance can be avoided by detecting from a short range to a long range. This is because, unlike the front, LRR is not required because most of them are driven (in the case of certain vehicles, the reverse speed is limited).

Lastly, referring to the WFR shown on the two sides of the autonomous vehicle (AV), it can be seen that the basic details are the same as the description regarding the front and rear, but compared to SRR, MRR and LRR, WFR has an overwhelmingly high FoV. This is because WFR is used to detect the blind spot or the lane when the lane has been changed.

If all the radar modules that individually detect the area shown in FIG. 1 are mounted, general autonomous driving may be possible, but since one radar module detects each area, a total of nine radar modules should be mounted on the autonomous vehicle (AV) and therefore, there is a problem in that it inevitably causes rise in price of the autonomous vehicles (AVs).

Hereinafter, a multi-mode radar module 100 according to an embodiment of the present invention that can solve this problem at a time will be described.

Figure 2:
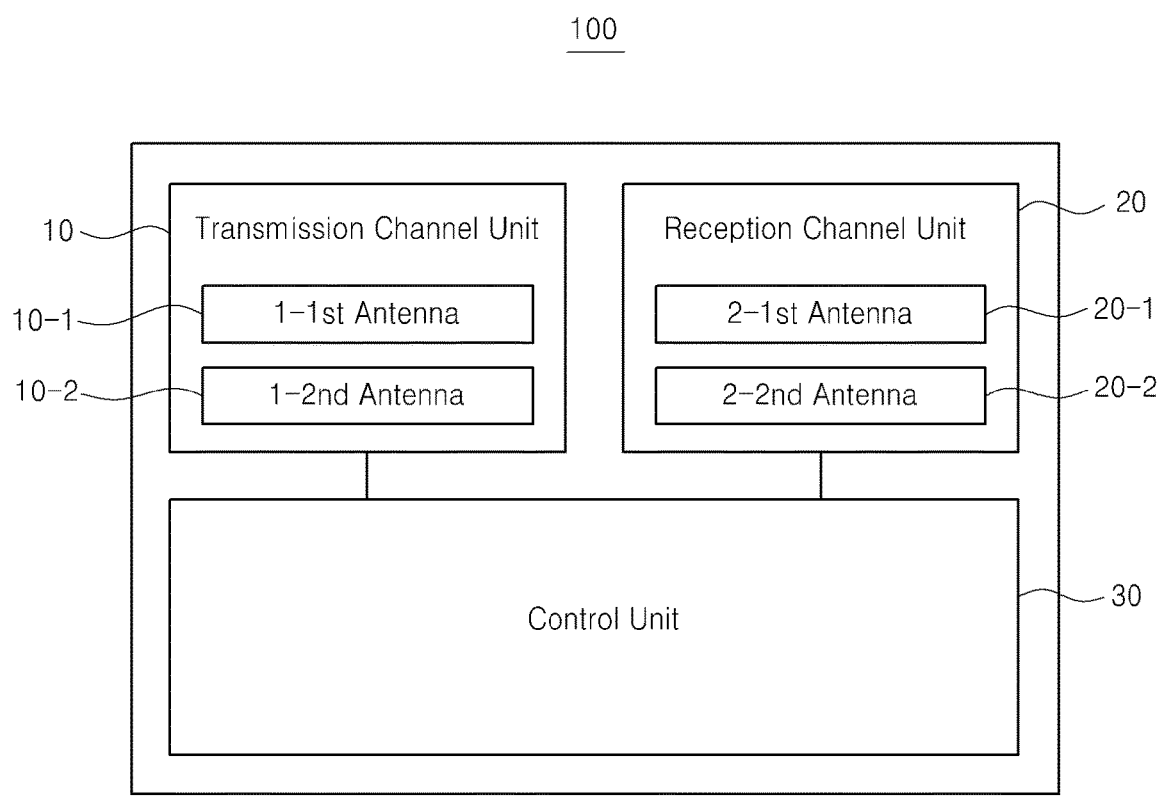
FIG. 2 is a diagram showing the overall configuration of a radar module using multiple polarizations according to the first embodiment of the present invention.

FIG. 2 is a diagram showing the configuration of a multi-mode radar module 100 according to an embodiment of the present invention.

The multi-mode radar to an module 100 according embodiment of the present invention includes a reception channel unit 10, a transmission channel unit 20, a control unit 30 and a power supply unit 40. Of course, it may further include typical configurations required to achieve other objects of the present invention.

The reception channel unit 10 includes M (M is a positive integer) number of reception channel antennas 11.

Here, the reception channel antenna 11 may be a wide-angle antenna having a 3 dB beam width characteristics of 150° or more. In this case, there is an advantage in that the detectable angle can be expanded when the antenna is mounted on the autonomous vehicle (AV).

Meanwhile, M is a positive integer and there is no limit to its size. When M is two or more, the reception channel unit 10 can operate as a Multi Input Multi Output (MIMO) system.

In order for such a reception channel unit 10 to operate as a MIMO system, not only M must be two or more, but also a certain regularity is required in the arrangement of each reception channel antenna 11 in which each reception channel antenna 11 is arranged at the interval of multiple of 0.5λ, but the interval of multiple of 0.5λ may be less than the product of 0.5λ and N, which is the number of transmission channel antennas 21 to be described later.

For example, when N is three, the reception channel antenna 11 may be arranged at an interval of any one of 0.5λ, 1λ and 1.5λ, but cannot be arranged at an 2λ interval exceeding 1.5λ, which is the product of 0.5λ and N.

Figure 3:
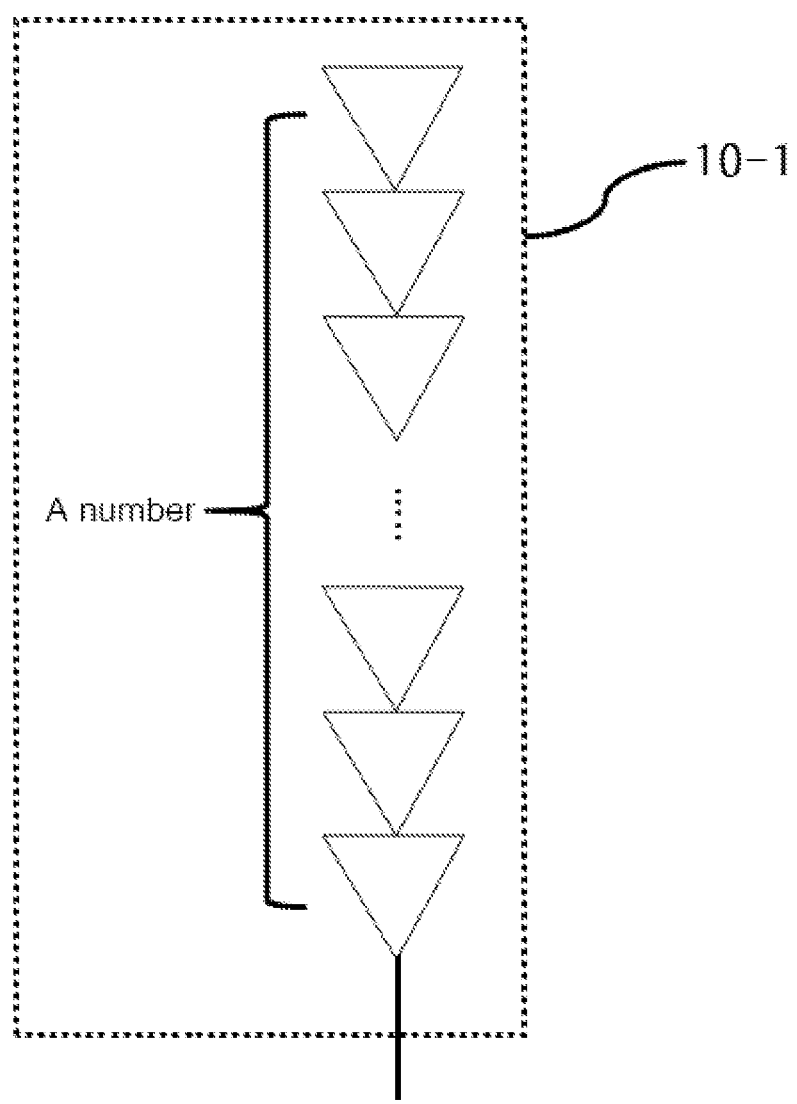
FIG. 3 is a diagram exemplarily illustrating a 1-1st antenna.

FIG. 3 exemplarily shows the reception channel unit 10 including four reception channel antennas 11 when M is 4, wherein it can be seen that the interval between the individual reception channel antennas 11 has been uniformly arranged at 1.5λ. The following explanation continues while considering this point.

The transmission channel unit 20 includes N (N is a positive integer) transmission channel antennas 21.

Here, the transmission channel antenna 21 may also be a wide-angle antenna having a 3 dB beam width characteristics of 150° or more, as with the receiving antenna 11, and in this case, when the antenna is mounted on an autonomous vehicle (AV), there is an advantage that the detectable angle can be expanded.

Meanwhile, N is a positive integer and there is no limit to its size, and when N is 2 or more, the transmission channel unit 20 can operate as a Multi Input Multi Output (MIMO) system.

In order for the transmission channel unit 20 to operate as a MIMO system, not only N is 2 or more, but also a certain regularity is required in the arrangement of each transmission channel antenna 21, wherein each transmission channel antenna 21 is may be arranged at multiple interval of 0.5λ.

In this case, considering the previous mentions that the arrangement interval of the reception channel antennas 11 included in the reception channel unit 10 is equal to or smaller than the product of the multiple interval of 0.5λ and N, when the arrangement interval of the transmission channel antennas 21 is 0.5A, the arrangement of interval the reception channel antennas 11 may be 0.5λ, 1λ, 1.5λ . . . , 0.5 λ*N and thus the arrangement interval of the transmission channel antennas 21 may be less than or equal to the arrangement interval of the reception channel antennas 11.

Figure 4:
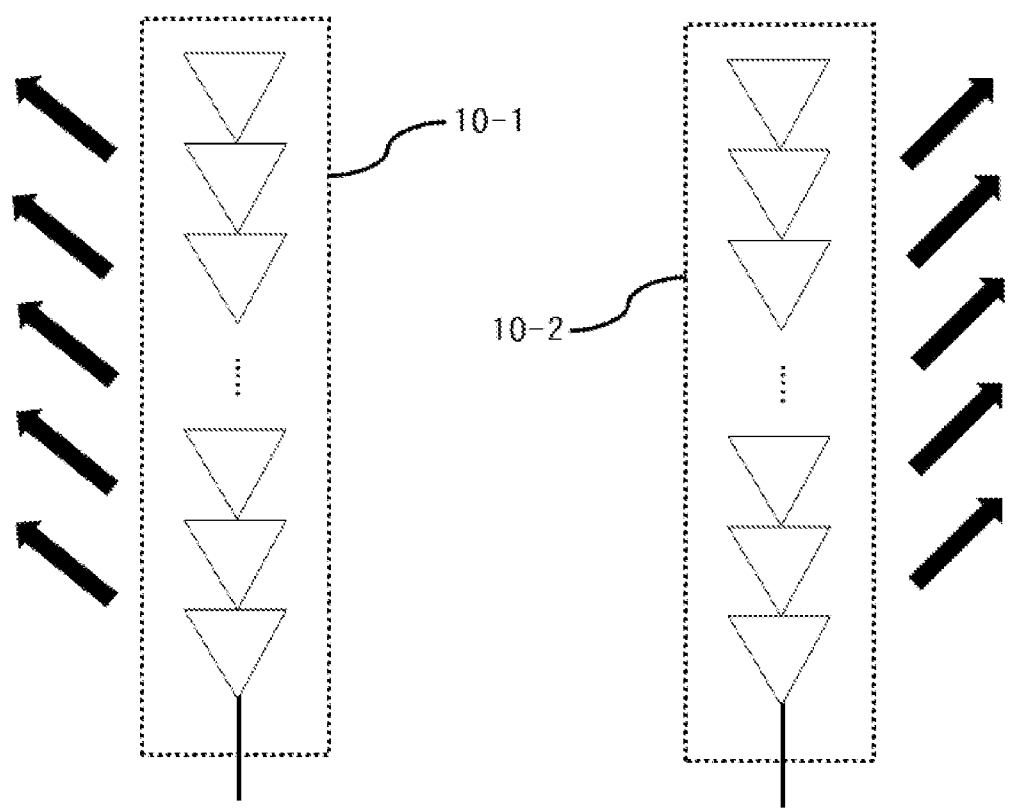
FIG. 4 is a diagram exemplarily illustrating polarization characteristics of electromagnetic waves transmitted by the 1-1st and 1-2nd antennas.

FIG. 4 exemplarily shows the transmission channel unit 20 including three transmission channel antennas 21 when N is 3, wherein it can be seen that the interval between the individual transmission channel antennas 21 is uniformly arranged at 0.5λ. The following explanation continues while considering this point.

Meanwhile, the relationship between the M number of the reception channel antennas 11 included in the reception channel unit 10 and the N number of transmission channel antennas 21 included in the transmission channel unit 20 is not particularly limited. It is common for M to be greater than or equal to N, but it is not necessarily limited thereto, and the opposite case is also possible.

A control unit 30 individually controls phases or outputs of channel signals transmitted by the N transmission channel antennas depending on the selection of a detection mode.

Here, selection of the detection mode may be a driver's selection to change driving conditions such as front, rear, turn, lane change and parking when the multi-mode radar module 100 according to an embodiment of the present invention is mounted on the autonomous vehicle (AV) or may be the reception of a control signal from the ECU (not shown) according to the driver's selection. For convenience of explanation, it will be briefly referred to as the selection of the detection mode.

This detection mode may be any one of the first to fourth modes provided to perform different functions in response to various driving conditions. Hereinafter, these modes will be described in order starting from the first mode.

The first mode is a short-range front/rear detection mode being separately operated without synthesizing the channel signals of the transmission channel antennas 21, and may be divided into a first mode of single transmission operation and a first mode of a multi-channel transmission operation.

Here, the first mode of single transmission operation means a case where the number of transmission transmit channel antennas is 1, that is, N is 1. In this case, the multi-mode radar module 100 according to an embodiment of the present invention can operate as an M-channel antenna module.

The first mode of multi-channel transmission operation means a case where the number of transmission channel antennas is plural, that is, N is 2 or more. In this case, the multi-mode radar module 100 according to an embodiment of the present invention can operate as a MIMO system which is a M*N channel radar module. Accordingly, the precision of the radar can be improved and it will be suitable for short-range front/rear detection mode.

For example, as previously considered in FIGS. 3 and 4, if the number of reception channel antennas 11 included in the reception channel unit 10 is 4 and the number of transmission channel antennas 21 included in the transmission channel unit 20 is 3, it can operate as a 12-channel radar module. Accordingly, the number of channels for detecting a certain detection area are increased, thereby improving the precision.

Figure 5:
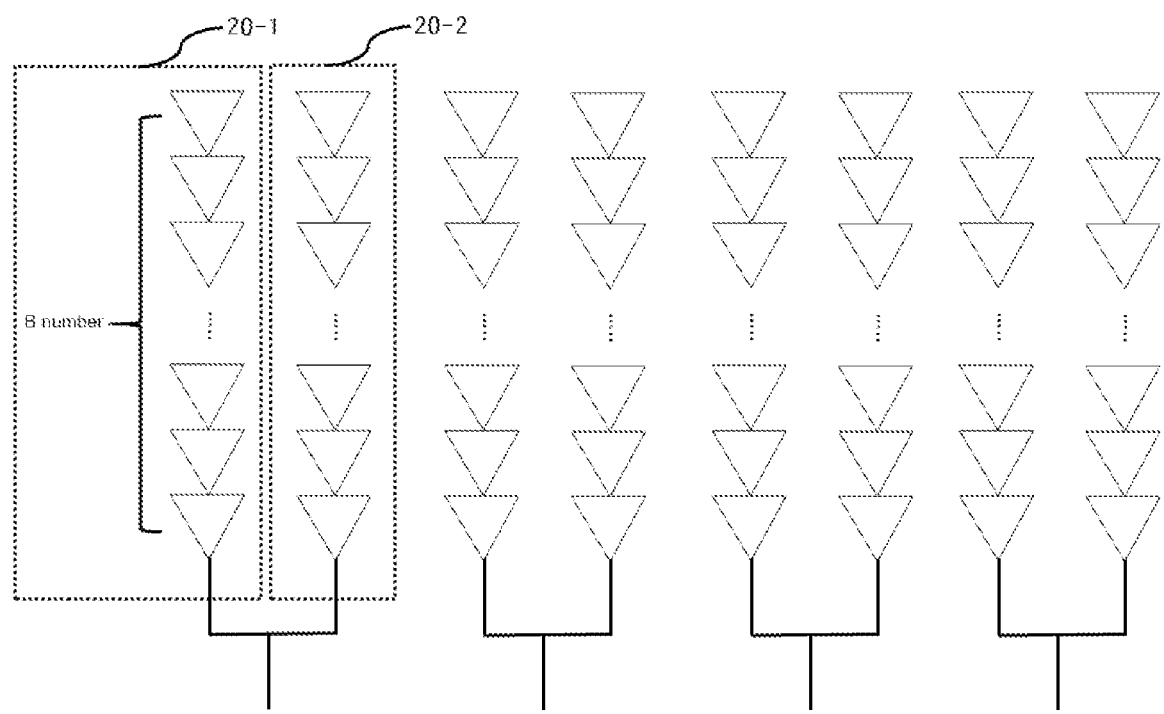
FIG. 5 is a diagram exemplarily illustrating four reception channels, that is, reception 4 channels.

FIG. 5 shows the radiation pattern of the transmission channel antenna 21 according to the first mode. Referring to FIG. 5, it can be seen that the gain of the radiation pattern is relatively uniformly distributed regardless of the phase change of the channel signal, thereby also improving the precision and representing the function of the first mode suitable for the short-range front/rear detection mode (SRR).

Figure 6:
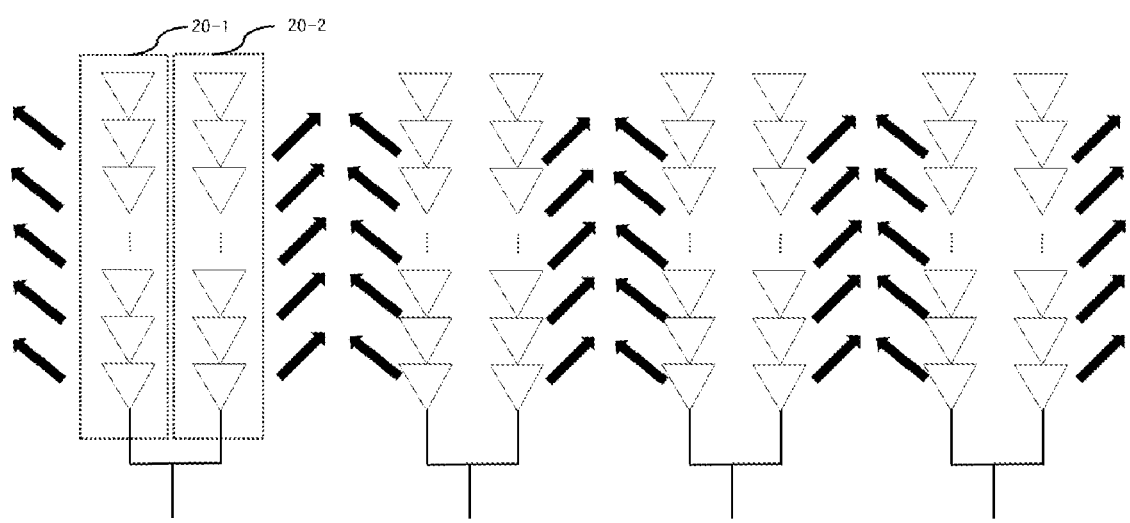
FIG. 6 is a diagram exemplarily illustrating polarization characteristics of echo waves received by the 2-1 and 2-2 antennas.

The second mode is a medium-range/long-range front/rear detection mode in which channel signals of the transmission channel antennas 21 are synthesized, and FIG. 6 is a table describing the channel signal output and phase of the transmission channel antennas 21 according to the second mode. Considering previous mention in FIG. 4 that the number of transmission channel antennas 21 is 3, for convenience of explanation, these antennas will be referred to as a first transmission channel antenna, a second transmission channel antenna and a third transmission channel antenna.

When the second mode is selected, the control unit 30 can equally control all phases of channel signals transmitted by the N transmission channel antennas 21.

Referring to FIG. 6, it can be seen that in the case of the second mode, the phases of the channel signals of the first transmission channel antenna, the second transmission channel antenna and the third transmission channel antenna are all equal to 0°, thereby increasing the detection distance.

Meanwhile, the phase of the channel signal, 0°, is an exemplary value and can be equally controlled with a different value, but is not necessarily limited thereto. Since the second mode is a mid-range front/rear detection mode, it is desirable to equally control the phase of the channel signal to be 0° so that it extends straight front/rear. If the phase of the channel signal is not 0° it will have directivity toward the direction of the corresponding phase.

Furthermore, when the second mode is selected, the control unit 30 can control the outputs of channel signals transmitted by the N transmission channel antennas 21 to be symmetric with respect to the center of the N transmission channel antennas 21.

Similarly, referring to FIG. 6, it can be seen that in the case of the second mode, the output of the first transmission channel antenna is −6 dBm and the output of the third transmission channel antenna is also −6 dBm on the basis of the second transmission channel antenna arranged at the center. Through this, high radiation power and low side lobe characteristics can be implemented.

Figure 7:
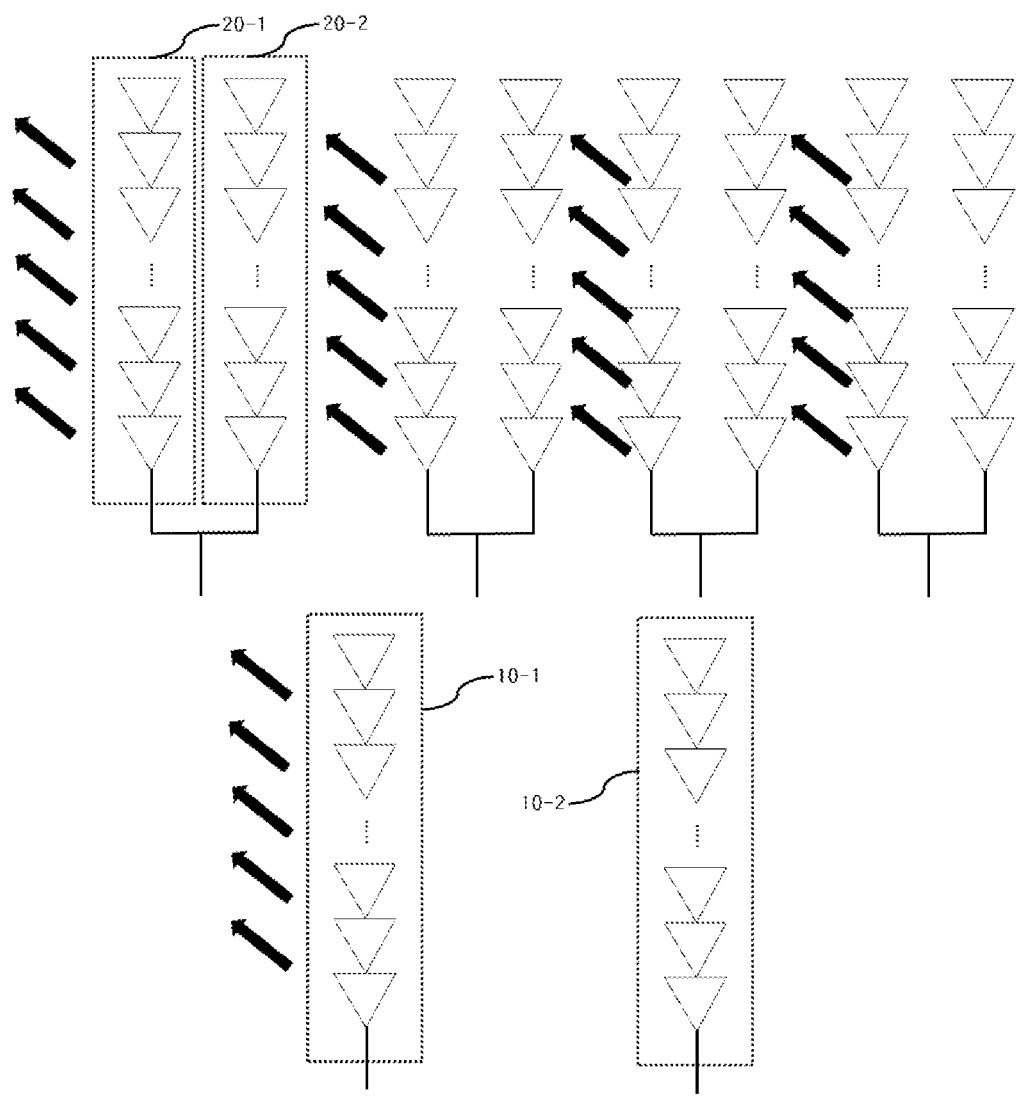
FIG. 7 is a diagram illustrating transmission and reception of waves between a transmission channel unit and a reception channel unit and the radiation pattern of the transmission channel antennas in the transmission channel unit when the control unit selects the first mode in the radar module using multiple polarizations according to the first embodiment of the present invention.

FIG. 7 shows the radiation pattern of the transmission channel antennas 21 according to the second mode. Referring to FIG. 7, it can be seen that the gain increases as it approaches 0°, which is the center, and this can also be seen as representing the function of the second mode suitable for medium/long-distance front/rear detection mode which should implement increased detection distance and high radiation power.

The third mode is a lateral maximum detection mode in which the channel signals of the transmission channel antennas 21 are synthesized. The lateral maximum detection mode is a new mode according to the present invention that can maximize the detection characteristics in the lateral direction in contrast to the conventional lateral detection mode, WFR. The channel signal outputs and phases of the transmission channel antennas 21 according to the third mode are shown in a table in FIG. 8.

When the third mode is selected, the control unit 30 can control the phases of the channel signals transmitted by the N transmission channel antennas 21 to have a 180° difference between transmission channel antennas adjacent to each other, among the N transmission channel antennas 21.

Figure 8:
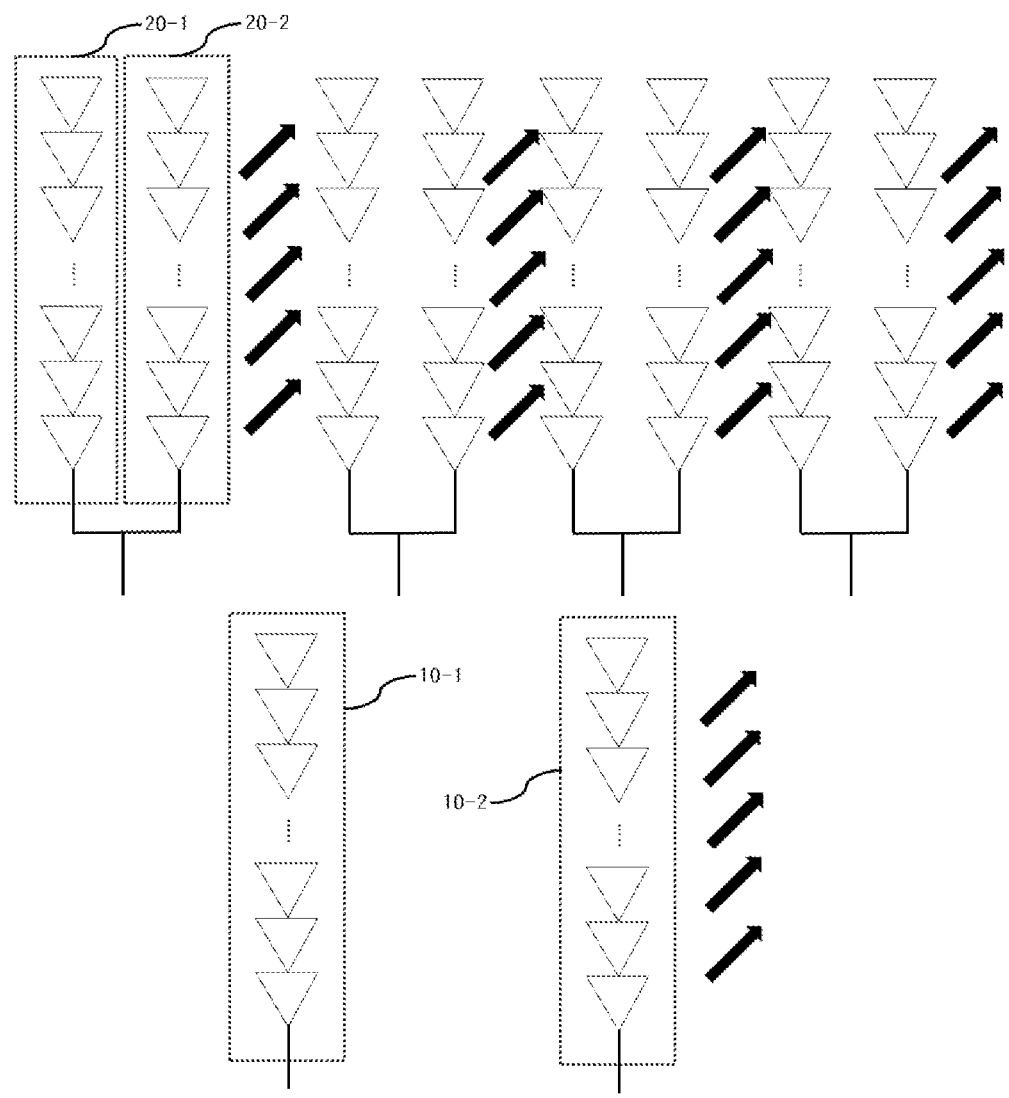
FIG. 8 is a diagram illustrating transmission and reception of waves between a transmission channel unit and a reception channel unit and the radiation pattern of the transmission channel antennas in the transmission channel unit when the control unit selects the second mode in a radar module using multiple polarizations according to the first embodiment of the present invention.

Referring to FIG. 8, it can be seen that in the case of the third mode, the phase of the channel signal of the second transmission channel antenna arranged at the center is 0°, and the phases of the channel signals of the first transmission channel antenna and the third transmission channel antenna arranged at both ends are −180°, and the phase difference between the first transmission channel antenna and the second transmission channel antenna and the phase difference between the second transmission channel antenna and the third transmission channel antenna which are adjacent to each other are 180°, respectively. Through this, Radiation direction can be directed to the side.

Meanwhile, the phase of the channel signal of the second transmission channel antenna, 0° is an exemplary value and can be controlled to be a different value, but it is not necessarily limited thereto. Because the phases of the channel signals of the second transmission channel antenna and the first and third transmission channel antennas will be controlled to be 180° different, only the direction of the focusing side will be different, and thus the overall appearance will be implemented similarly.

Furthermore, when the third mode is selected, the control unit 30 controls the outputs of the channel signals transmitted by the N transmission channel antennas 21 so that the transmission channel antennas arranged on both sides on the basis of the transmission channel antenna arranged in the center among the N transmission channel antennas 21 are symmetrical to each other (if N is an odd number) or control one of the transmission channel antennas which are arranged in the center and which are adjacent to each other with the maximum output. However, the remaining transmission channel antennas can be controlled with a lower output than it (when N is an odd number).

Similarly, referring to FIG. 8, it can be seen that in the case of the third mode, the output of the first transmission channel antenna is −8 dBm and the output of the third transmission channel antenna is also −8 dBm on the basis of the second transmission channel antenna arranged in the center, which is symmetrical to each other (N is an odd number). Through this, it is possible to implement high radiation power, and unlike the conventional side detection mode, WFR, it is possible to raise the detection characteristics in the side direction to the maximum value, and the frontal null phenomenon which may partially occur, can be adjusted by adjusting the feed power for each transmission channel antenna 212.

Meanwhile, although not shown in a separate drawing, when N is an even number, for example, N is 4, an output of any one of the second transmission channel antenna and the third transmission channel antenna arranged in the center and adjacent to each other can be controlled to have OdBm, the other output can be controlled to have −6 dBm, and the outputs of the remaining first and fourth transmission channel antennas can be controlled to have −6 dBm and −8 dBm lower than OdBm, respectively.

Figure 9:
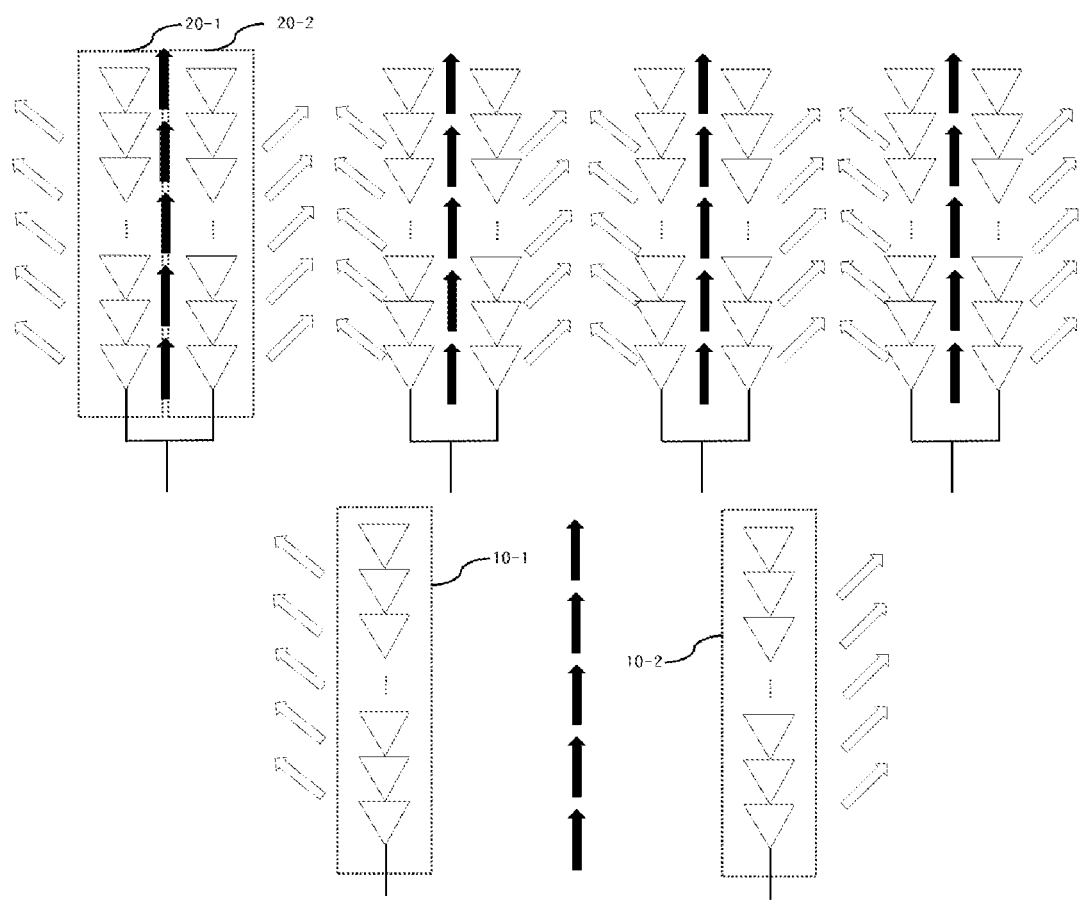
FIG. 9 is a diagram illustrating transmission and reception of waves between a transmission channel unit and a reception channel unit and the radiation pattern of the transmission channel antennas in the transmission channel unit when the control unit selects the third mode in a radar module using multiple polarizations according to the first embodiment of the present invention.

FIG. 9 shows the radiation pattern of the transmission channel antenna 21 according to the third mode. Referring to FIG. 9, it can be seen that the gain increases the closer to around ±90°, which is both ends, and the gain decreases the closer to 0°, which is the center. This can also be seen as representing the function of the third mode suitable for the side maximum detection mode in which the widest side area should be detected.

This third mode can be used very usefully in an environment where many blind spots occur due to the presence of a parked vehicle or an alley while driving at low speed, such as on a back road.

The fourth mode is a detection direction change mode in which the channel signals of the transmission channel antennas 21 are synthesized, and is a new mode according to the present invention as with the third mode. The channel signal power and phase are shown in a table.

When the fourth mode is selected, the control unit 30 can control the phases of the channel signals transmitted by the N transmission channel antennas 21 to make the same difference respectively as it goes from the transmission channel antenna arranged at one end to the transmission channel antenna arranged at the other end, among the N transmission channel antennas.

Figure 10:
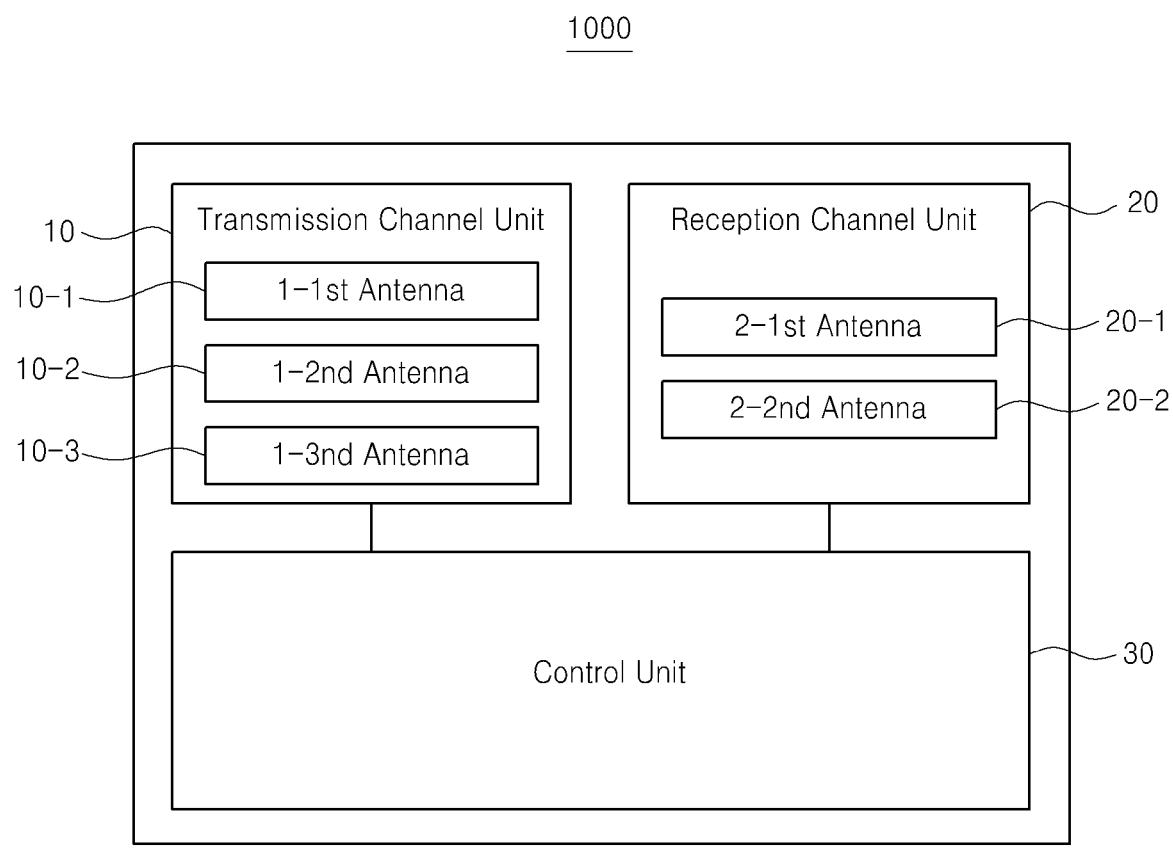
FIG. 10 is a diagram illustrating the overall configuration of a radar module using multiple polarizations according to a second embodiment of the present invention.

Referring to FIG. 10, it can be seen that in the case of the fourth mode, the phase of the channel signal of the first transmission channel antenna arranged at one end is 0°, the phase of the channel signal of the second transmission channel antenna arranged in the center is −140°, and the phase of the channel signal of the third transmission channel antenna arranged at the other end is −280°. Through this, the phase of the channel signal can be changed to become asymmetrical, thereby changing the detection direction and concentrating the detection on a specific direction.

Meanwhile, 0° which is the phase of the channel signal of the first transmission channel antenna is an exemplary value and can be controlled to a different value, but it is not necessarily limited thereto. Because it will be controlled to make the same difference as the phases of the channel signals of the second and third transmission channel antennas, only the direction to be detected will be different, and the overall appearance will be implemented similarly.

Similarly, 140°, which is the same difference of the phases of the channel signals of the first transmission channel antenna, the second transmission channel antenna and the third transmission channel antenna, is also an exemplary value and can be controlled to make the same difference with different value. It can be controlled to make a difference of any one of 0° to 180°. In this case, if the same difference is 0°, it can operate in the second mode, and if the same difference is 180°, it can operate in the third mode. Accordingly, the fourth mode can operate as a mode that can perform intermediate operation between the second mode and the third mode, and can be used very usefully for a lane change assist (LCA) for lane change while driving, a rear cross for rear detection when parking and a blind traffic alert (RCTA) for blind spot detection by using the spot detection (BSD) characteristics that the maximum detection direction is determined based on the asymmetric phase difference.

Furthermore, when the fourth mode is selected, the control unit 30 can control the outputs of the channel signals transmitted by the N transmission channel antennas 21 to make the same difference as it goes from the transmission channel antenna arranged at one end to the transmission channel antenna arranged at the other end, among the N transmission channel antennas 21 wherein the direction for making the same difference is the same as the direction for making the same difference in the phase control described above.

Similarly, referring to FIG. 10, it can be seen that in the case of the fourth mode, the output of the channel signal of the first transmission channel antenna arranged at one end is 0 dBm, the output of the channel signal of the second transmission channel antenna arranged at the center is −4 dBm, and the output of the channel signal of the third transmission channel antenna arranged at the other end is −8 dBm. Through this, the detection distance for a specific direction can be increased to the maximum value and the null phenomenon can be minimized.

Meanwhile, as in the case of the phase, 4 dBm which is the same difference between the outputs of the channel signals of the first transmission channel antenna, the second transmission channel antenna and the third transmission channel antenna, is also an exemplary value. Of course, it is possible to control to make the same difference with different values.

Figure 11:
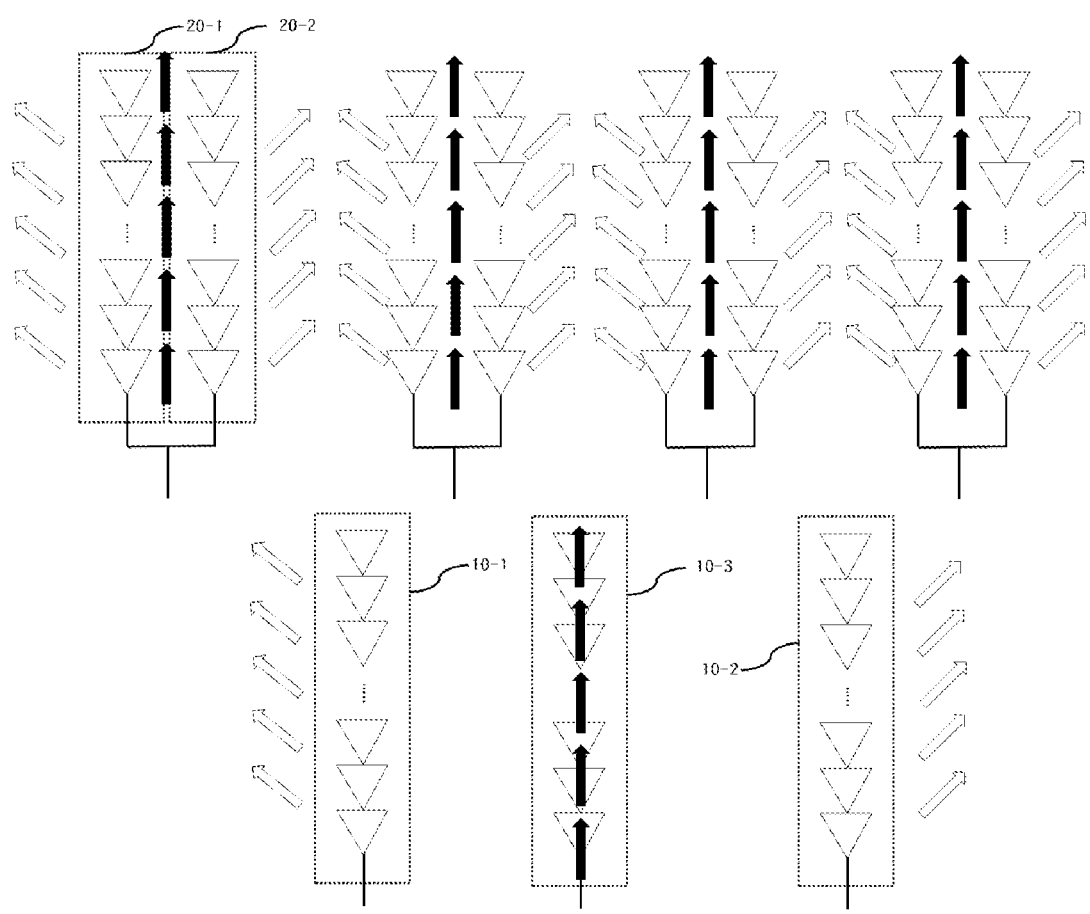
FIG. 11 is a diagram illustrating transmission and reception of waves between a transmission channel unit and a reception channel unit and the radiation pattern of the transmission channel antennas in the transmission channel unit when the control unit selects the third mode in a radar module using multiple polarizations according to a second embodiment of the present invention.

FIG. 11 shows the radiation pattern of the transmission channel antennas 21 according to the fourth mode. Referring to FIG. 11, it can be seen that the radiation pattern is asymmetrical differently from the first to third modes, and the gain is high only at specific phases, such as around −75°, around −15° and around −45°, and this can also be seen as representing the function of the fourth mode in which a detection should be focused on a specific detection direction by changing the detection direction.

The description continues going back to FIG. 2 again.

A power supply unit 40 supplies power to the reception channel unit 10, the transmission channel unit 20 and the control unit 30. The power signal supplied to the power supply unit 40 is provided from a battery (not shown) mounted in the autonomous vehicle (AV), and the power can be effectively supplied to the reception channel unit 10, the transmission channel unit 20 and the control unit 30 by repeating charging and discharging the battery, and If the device is not operating in the first to fourth modes, unnecessary power consumption may be prevented by switching to sleep mode.

So far, the multi-mode radar module 100 according to an embodiment of the present invention has been described. According to the present invention, a short-range front/rear detection mode, a medium/long-range front/rear detection mode, a side maximum detection mode and a detection direction change mode can be implemented at a time through one radar module based on the driving state of an autonomous vehicle (AV).

FIG. 2 is a diagram showing the configuration of a radar module 100 using multiple polarizations according to the first embodiment of the present invention.

The radar using module 100 multiple polarizations according to the first embodiment of the present invention includes a transmission channel unit 10, a reception channel unit 20 and a control unit 30. Of course, it may further include typical components required in achieving other objects of the present invention.

The transmission channel unit 10 includes a 1-1st antenna 10-1 and a 1-2nd antenna 10-2 for transmitting electromagnetic waves representing polarization characteristics different from each other.

Here, because one antenna represents one channel, when the transmission channel unit 10 includes the 1-1st antenna 10-1 and the 1-2nd antenna 10-2, transmission 2 channel can be implemented by two antennas.

The 1-1st antenna 10-1 will be described in more detail with reference to FIG. 3. The 1-1st antenna 10-1 has A (A is a positive integer) number of radiating elements of a shape connected in a row. Since the shape of the first and second antennas 10-2 is also the same, a separate illustration is omitted, but the polarization characteristics of electromagnetic waves transmitted by each antenna are different.

This is exemplarily shown in FIG. 4, when the direction of the arrow is the polarization characteristics of the electromagnetic waves, it can be seen that the polarization characteristics of the electromagnetic waves transmitted by the 1-1st antenna 10-1 and the polarization characteristics of the electromagnetic waves transmitted by the 1-2nd antenna 10-2 are different. More specifically, the 1-1st antenna 10-1 and the 1-2nd antenna 10-2 are configured so that the polarization characteristics of the electromagnetic waves transmitted by the 1-1st antenna 10-1 and the polarization characteristics of the electromagnetic waves transmitted by the 1-2nd antenna 10-2 can have orthogonal polarization characteristics which will be described later.

The reception channel unit 20 includes N (where N is a natural number) reception channels including a 2-1st antenna 20-1 and a 2-2nd antenna 20-2 for receiving echo waves of the electromagnetic waves transmitted by the transmission channel unit 10 to an object and reflected back from the object.

Here, the number of channels of the reception channel unit 20 depends on N which is the number of reception channels, and does not depend on the number of antennas as in the case of the transmission channel unit 10. The 2-1st antenna 20-1 and the 2-2nd antenna 20-2 are only the configurations that are separately named for convenience of explanation, and because the 2-1st antenna 20-1 and the 2-2nd antenna 20-2 share an input terminal and more specifically, it can be seen as one antenna constituting one reception channel by being connected through one feed line, and thus the number of reception channels corresponding to one antenna becomes the number of channels of the reception channel unit 20.

FIG. 5 is a diagram exemplarily showing four reception channels, that is, reception 4 channels. It can be seen that looking on the basis of one reception channel, it includes the 2-1st antenna 20-1 and the 2-2nd antenna 20-1 sharing an input terminal, and each of the 2-1st antenna 20-1 and the 2-2nd antenna 20-2 may have B (B is a positive integer) number of radiation elements of a shape connected in a row. A regarding the 1-1st antenna 10-1 and 1-2nd antenna 10-2 and B regarding the 2-1st antenna 20-1 and 2-2nd antenna 20-2, which representing the number of radiation elements, may be the same or different.

Meanwhile, referring to FIG. 6, the polarization characteristics of the echo waves received by the 2-1st antenna 20-1 and the polarization characteristics of the echo waves received by the 2-2nd antenna 20-1 are also different, and more specifically, it may have an orthogonal polarization characteristics as the polarization characteristics, which will be described later.

The control unit 30 selects the driving modes of the transmission channel unit 10 and the reception channel unit 20.

Here, the driving mode may be a first mode to a third mode, and more specifically, it may be a mode that is divided depending on the form of controlling the ON/OFF of the input power supply signal being inputted to each of the 1-1st antenna 10-1 and the 1-2nd antenna 10-2 included in the transmission channel unit 10, which will be described later.

When the control unit 30 selects the driving mode as the first mode, the control unit 30 causes the transmission channel unit 10 to transmit electromagnetic waves representing 135 deg polarization characteristics from the 1-1st antenna 10-1, and causes the receiving channel unit 20 to receive, by all of the 2-1st antennas 20-1, echo waves of the 135 deg polarization characteristics of the electromagnetic waves transmitted by the 1-1st antenna 10-2 to an object and reflected back from the object and causes the 2-2nd antenna and not to receive, by the 2-2 antenna 20-2, any echo waves.

Explaining this a little more easily, in the first mode, the 1-1st antenna 10-1 included in the transmission channel unit 10 transmits electromagnetic waves representing specific polarization characteristics, and the 1-2nd antenna 20-1 included in the reception channel unit 20 receives the echo waves of the corresponding electromagnetic wave having been reflected back from the object, but representing the same polarization characteristics as the transmitted electromagnetic wave. To do this, the control unit 30 causes the transmission channel unit 10 to input a feed signal to the 1-1st antenna 10-1 and block the feed signal from being inputted to the 1-2nd antenna 10-2. Here, blocking of the feed signal may be performed through a known method such as ON (input)/OFF (blocking) of a switch. The 1-1st antenna 10-1 and 1-2nd antenna 10-2 represent one channel, respectively and thus, the switch can be referred to as a switch that controls ON/OFF for each channel.

Meanwhile, since the 2-1st antenna 20-1 receives the echo waves of the electromagnetic waves transmitted by the 1-1st antenna 10-1 and reflected back from an object, the polarization characteristics of electromagnetic waves transmitted by the 1-1st antenna 10-1 and the polarization characteristics of the echo waves received by the 2-1st antenna 20-1 must be the same wherein if the polarization characteristics of the electromagnetic waves transmitted by the 1-1st antenna 10-1 is 135 deg, the polarization characteristics of the echo waves received by the 2-1st antenna 20-1 will be 135 deg.

FIG. 7 is a diagram showing transmission and reception of waves between the transmission channel unit 10 and the reception channel unit 20. It can be seen that the 1-1st antenna 10-1 transmits the electromagnetic waves and the 2-1st antenna 20-1 receives the echo waves of the electromagnetic waves. The 2-1st antenna 20-1 has N, which is the number of channels of the receiving channel unit 20 (in the case of FIG. 7, four channels) and thus all of the four 2-1st antennas 20-1 receive the echo waves thereby improving the accuracy of reception.

Now, the second mode will be described.

When the control unit 30 selects the driving mode as the second mode, the control unit 30 causes the transmission channel unit 10 to transmit, by the 1-2nd antennas 10-2, electromagnetic waves representing 45 deg polarization characteristics to an object by the 1-2nd antennas 10-2 and causes the reception channel unit 20 to receive, by all of the 2-2nd antennas including the N number of reception channels (20-2), the echo waves representing the 45 deg polarization characteristics of the electromagnetic waves which have been transmitted by the 1-2nd antenna 10-2 to the object and reflected back from the object and not to receive, by the 2-1st antenna 20-1, any echo waves.

In this second mode, the 1-2nd antenna 10-2 included in the transmission channel unit 10 transmits the electromagnetic waves representing specific polarization characteristics, and the 2-2nd antenna 20-2 included in the reception channel unit 20 receives the echo waves of the corresponding electromagnetic waves which have been reflected back from the object and which represents the same polarization characteristics as the transmitted electromagnetic waves. To do this, the control unit 30 can cause the transmission channel unit 10 to input a feed signal to the 1-2nd antenna 10-2 and to block the feed signal from being inputted to the 1-1st antenna 10-1. Here, blocking of the feed signal may be performed through a known method such as ON (input)/OFF (blocking) of a switch. Each of the 1-1st antenna 10-1 and 1-2nd antenna 10-2, represents one channel, the switch herein will be referred to as a switch that controls ON/OFF for each channel.

Meanwhile, since the 2-2 antenna 20-2 receives the echo waves of the electromagnetic waves transmitted by the 1-2nd antenna 10-2 to the object and reflected back from the object, the polarization characteristics of electromagnetic waves transmitted by the 1-2nd antenna 10-2 and the polarization characteristics of the echo waves received by the 2-2nd antenna 20-2 should be the same the polarization characteristics of the wherein if electromagnetic waves transmitted by the 1-2nd antenna 10-2 is 45 deg, the polarization characteristics of the echo wave received by the 2-2nd antenna 20-2 will be 45 deg.

FIG. 8 is a diagram showing transmission and reception of waves between the transmission channel unit 10 and the reception channel unit 20 and the radiation pattern of the transmission channel antennas in the transmission channel unit 10 when the controller 30 selects the second mode, and it can be seen that the 1-2nd antenna 10-2 transmits electromagnetic waves and the 2-2nd antenna 20-2 receives the echo waves of the electromagnetic waves. The 2-2nd antenna 20-2 has N, which is the number of channels of the receiving channel unit 20 (in the case of FIG. 8, four channels) and thus all of the four 2-2nd antennas 20-2 receive the echo waves thereby improving the accuracy of reception.

Lastly, the third mode will be described.

When the control unit 30 selects the driving mode as the third mode, the control unit 30 causes the transmission channel unit 10 to transmit, by the 1-1st antenna 10-1, electromagnetic waves representing 135 deg polarization characteristics and transmit, by the 1-2nd antenna 10-2 electromagnetic waves representing 45 deg polarization characteristics, thereby causing all of the transmission channel unit 10 to transmits the electromagnetic waves representing 90 deg (vertical polarization) polarization characteristics and causing the reception channel unit 20 to receive, by both the 2-1st antenna 20-1 and the 2-2nd antenna 20-1 included in N receiving channels, the echo waves representing a 90 deg polarization characteristics of the electromagnetic waves transmitted by the transmission channel unit 10 to the object and reflected back from the object.

Unlike the first mode and the second mode described above, this third mode causes all of the 1-1st antenna 10-1 and the 1-2nd antenna 10-2 included in the transmission channel unit 10 to transmit the electromagnetic waves. When the polarization characteristics of the electromagnetic waves transmitted by the 1-1st antenna 10-1 is 135 deg, the polarization characteristics of the electromagnetic waves transmitted by the 1-2nd antenna 10-2 is 45 deg and therefore, if both antennas transmit electromagnetic waves, the electromagnetic waves representing the polarization characteristics of 90 deg can be transmitted due to synthesis of polarization characteristics. In this case, the transmission channel unit 10 does not have to include a separate antenna for transmitting the electromagnetic waves representing the 90 deg polarization characteristics, and thus the entire size of the radar can be miniaturized and manufacturing costs can be reduced.

Furthermore, unlike the first mode and the second mode described above, the third mode causes the all of N number of 2-1st antenna 20-1 and 2-2nd antenna 20-2 included in the reception channel unit 20 to receive the echo waves. When the 1-1st antenna 10-1 transmits electromagnetic waves representing a 135 deg polarization characteristics, the echo waves of the polarization characteristics received by the 2-1 antenna 20-1 is 135 deg and when the 1-2nd antenna 10-2 transmits the electromagnetic waves representing 45-degree polarization characteristics, the polarization characteristics of the echo waves received by the 2-2nd antenna 20-2 is 45 deg. If these two antennas receive both electromagnetic waves, the receiving channel unit 20 can receive the echo waves having 90 deg polarization characteristics as a whole due to synthesis of polarization characteristics.

FIG. 9 is a diagram showing transmission and reception of waves between a transmission channel unit 10 and a reception channel unit 20 and the radiation pattern of the transmission channel antennas in the transmission channel unit 10 when the control unit 30 selects the third mode. It can be seen that all of the 1-1st antenna 10-1 and the 1-2nd antenna 10-2 transmit the electromagnetic waves, and all of the 2-1 antenna 20-1 and the 2-2nd antenna 20-2 receive the echo waves. Since all of the 2-1st antenna 20-1 and the 2-2nd antenna 20-2 are N(in the case of FIG. 9, four channels) which is the number of channels of the reception channel unit 20, four 2-1st antennas 20-1 and the 2-2nd antenna 20-2 receive the echo wave, thereby improving the accuracy of reception.

Among the first to third modes described above, any one mode can be alternately selected during driving of the radar module 100 using multiple polarizations according to the first embodiment of the present invention. For example, it can be repeated such as the first mode—the second mode—the third mode or the first mode—the second mode—the third mode. Through this, an interference between radars can be overcome wherein when a radar mounted on a nearby vehicle (object) transmits the electromagnetic waves representing 135 deg polarization characteristics, if in the first mode, the electromagnetic waves representing 135 deg polarization characteristics is transmitted in the same way, the interference will occur, but after the first mode, the second or third mode will be performed to transmit electromagnetic waves representing polarization characteristics different from the polarization characteristics of 135 deg. Accordingly, in relation to them, the polarization characteristics are different and thus there is no room for the interference to occur, resulting in accurate recognition of the nearby vehicle.

So far, the radar module 100 using multiple polarizations according to the first embodiment of the present invention has been described. According to the present invention, the 1-1st antenna 10-1 and the 1-2nd antenna 10-2 included in the transmission channel unit 10 transmit electromagnetic waves representing different polarization characteristics depending on the first to third modes and the first to third modes are alternately performed. Even if an interference occurs in either mode because the polarization characteristics is the same as the electromagnetic waves transmitted by the radar mounted on the opponent vehicle, another mode of transmitting electromagnetic waves representing different polarization characteristics is performed immediately after the corresponding mode has been performed and therefore, the interference between radars can be overcome thereby improving the recognition rate of radar and contributing to safe driving for the driver. Also, with regard to the transmission channel unit 10, the transmission channel unit 10 does not need to include a separate antenna for transmitting electromagnetic waves representing 90 deg polarization characteristics, and can transmit the electromagnetic waves representing 90 deg polarization characteristics by including only the 1-1st antenna 10-1 for transmitting electromagnetic waves representing 135 deg polarization characteristics and the 1-2nd antenna 10-2 for transmitting electromagnetic waves representing 45 deg polarization characteristics and synthesizing the electromagnetic waves transmitted by these antennas. Therefore, the size of the entire radar module can be miniaturized and manufacturing costs can be reduced at the same time.

Meanwhile, the radar module 100 using multiple polarizations according to the first embodiment of the present invention has been described above on the premise that the 1-1st antenna 10-1 transmits the electromagnetic waves representing 135 deg polarization characteristics and the 1-2nd antenna 10-2 transmits the electromagnetic waves representing 45 deg polarization characteristics, and the 2-1 antenna 20-1 receives the echo waves representing 135 deg polarization characteristics and the 2-2nd antenna 20-2 receives the echo waves representing 45 deg polarization characteristics.

Unlike the above, the 1-1st antenna 10-1 may transmit the electromagnetic waves representing 45 deg polarization characteristics, and the 1-2nd antenna 10-2 may transmit the electromagnetic waves −45 representing deg polarization characteristics, and the 2-1st antenna 20-1 may receive the echo waves representing the 45 deg polarization characteristics and the 2-2nd antenna 20-2 may receive the echo waves representing the −45 deg polarization characteristics. In this case, in the previous description regarding the first mode and the second mode, only the portion regarding polarization characteristics will be changed to 45 deg and −45 deg, and in the case of the third mode, the entire transmission channel unit 10 may transmit the electromagnetic waves representing 0 deg (horizontal polarization) polarization characteristics, and the receiving channel unit 20 may also cause the 2-1st antenna 20-1 and 2-2nd antenna 20-2 included in N number of reception channels to receive the echo waves representing 0 deg polarization characteristics.

Hereinafter, the radar module 1000 using multiple polarizations according to a second embodiment of the present invention will be briefly described.

FIG. 10 is a diagram showing the configuration of a radar module 1000 using multiple polarizations according to a second embodiment of the present invention.

The radar module 1000 using multiple polarizations according to the second embodiment of the present invention has the same basic configuration as the radar module 100 using multiple polarizations according to the first embodiment of the present invention and includes a transmission channel unit 10, a reception channel unit 20 and a control unit 30. It may further include typical components required for achieving the object of the present invention, and only the difference therebetween will be described below.

The transmission channel unit 10 included in the radar module 1000 using multiple polarizations according to the second embodiment of the present invention may further include a 1-3rd antenna 10-3 in addition to the 1-1st antenna 10-1 and the 1-2nd antenna 10-2. The basic configuration of the 1-3 antenna (10-3) is the same as the previous 1-1st antenna 10-1 and the 1-2nd antenna 10-2, and thus the detailed description thereof will be omitted to avoid the redundant explanation.

The 1-3rd antenna 10-3 has polarization characteristics different from the polarization characteristics of the electromagnetic waves transmitted by the 1-1st antenna 10-1 and the polarization characteristics of the electromagnetic waves transmitted by the 1-2nd antenna 10-2. For example, if the polarization characteristics of the electromagnetic waves transmitted by the 1-1st antenna 10-1 is 135 deg and the polarization characteristics of the electromagnetic waves transmitted by the 1-2nd antenna 10-2 is is 45 deg, the polarization characteristics of the electromagnetic waves transmitted by the 1-3rd antenna 10-3 may be 90 deg (vertical polarization), and if the polarization characteristics of the electromagnetic waves transmitted by the 1-1st antenna 10-1 is 45 deg and the polarization characteristics of the electromagnetic waves transmitted by the 1-2nd antenna 10-2 is −45 deg, the polarization characteristics of the electromagnetic waves transmitted by the 1-3rd antenna 10-3 may be 0 deg (horizontal polarization).

This means that the 1-3rd antenna 10-3 is responsible for the third mode previously described in the radar module 100 using multiple polarizations according to the first embodiment of the present invention, which is exemplarily shown in FIG. 11. Because the 1-3rd antenna 10-3 is further included, the antenna module size may be slightly larger than that of the radar module 100 using multiple polarizations according to the first embodiment of the present invention. However, in the third mode, it is sufficient to input the feed signal only to the first-third antenna 10-3 and thus the power consumption can be reduced. In this case, the control unit 30 can alternately select any one mode of a first mode that causes the 1-1st antenna 10-1 to transmit the electromagnetic waves, a second mode that causes the 1-2nd antenna 10-2 to transmit the electromagnetic waves and a third mode that causes the 1-3rd antenna 10-3 to transmit the electromagnetic waves.

Although the embodiments of the present specification have been described with reference to the accompanying drawings, those skilled in the art may understand that the present invention may implemented in other specific forms without changing the technical spirit or essential features. Therefore, it should be understood that the embodiments described above are illustrative and not restrictive in all respects.

The invention claimed is:

1. A radar module using multiple polarizations comprising:
a transmission channel unit (Tx) including a 1-1st antenna and a 1-2nd antenna for transmitting the electromagnetic waves representing different polarization characteristics;
a reception channel unit (Rx) including N (where N is a natural number) reception channels including a 2-1st antenna and a 2-2nd antenna for receiving echo waves of the electromagnetic waves transmitted by the transmission channel unit to an object and reflected back from the object; and
a control unit for selecting the driving mode of the transmission channel unit and the reception channel unit,
wherein,
the 1-1st and 1-2nd antennas are configured so that the electromagnetic waves transmitted by the 1-1st antenna and the electromagnetic waves transmitted by the 1-2nd antenna represent orthogonal polarization characteristics,
when the control unit selects a third mode as a constant driving mode, the transmission channel unit causes the 1-1st antenna to transmit the electromagnetic waves representing 135 deg polarization characteristics and causes the 1-2 antenna to transmit the electromagnetic waves representing 45 deg polarization characteristics, thereby causing the entire transmission channel unit to transmit the electromagnetic waves representing 90 deg polarization characteristics, and
the receiving channel unit causes all of the 2-1 antennas and 2-2 antennas included in the N reception channels to receive echo waves representing 90 deg polarization characteristics of the electromagnetic waves transmitted by the transmission channel unit to the object and reflected back from the object.

2. The radar module according to claim 1, wherein when the control unit selects the driving mode as a first mode, the transmission channel unit causes the 1-1st antenna to transmit the electromagnetic waves representing 135 deg polarization characteristics, and the receiving channel unit causes all of the 2-1 antennas included in the N reception channels to receive echo waves representing 135 deg polarization characteristics of the electromagnetic waves transmitted by the 1-1st antenna to the object and reflected back from the object.

3. The radar module according to claim 2, wherein when the control unit selects the driving mode as the first mode, the transmission channel unit blocks a feed signal from being inputted to the 1-2nd antenna.

4. The radar module according to claim 1, wherein when the control unit selects the driving mode as a second mode, the transmission channel unit causes the 1-2nd antenna to transmit electromagnetic waves representing 45 deg polarization characteristics, and the receiving channel unit causes all of the 2-2nd antennas included in the N reception channels to receive echo waves representing 45 deg polarization characteristics of the electromagnetic waves transmitted by the 1-2nd antenna to the object and reflected back from the object.

5. The radar module according to claim 4, wherein when the control unit selects the driving mode as the second mode, the transmission channel unit blocks a feed signal from being inputted to the 1-1st antenna.

6. The radar module according to claim 1, wherein the control unit selects any one mode of a first mode that causes the 1-1st antenna to transmit electromagnetic waves, a second mode that causes the 1-2nd antenna to transmit electromagnetic waves, and a third mode that causes the 1-3rd antenna to transmit electromagnetic waves.

* * * * *